UNITED STATES PATENT OFFICE.

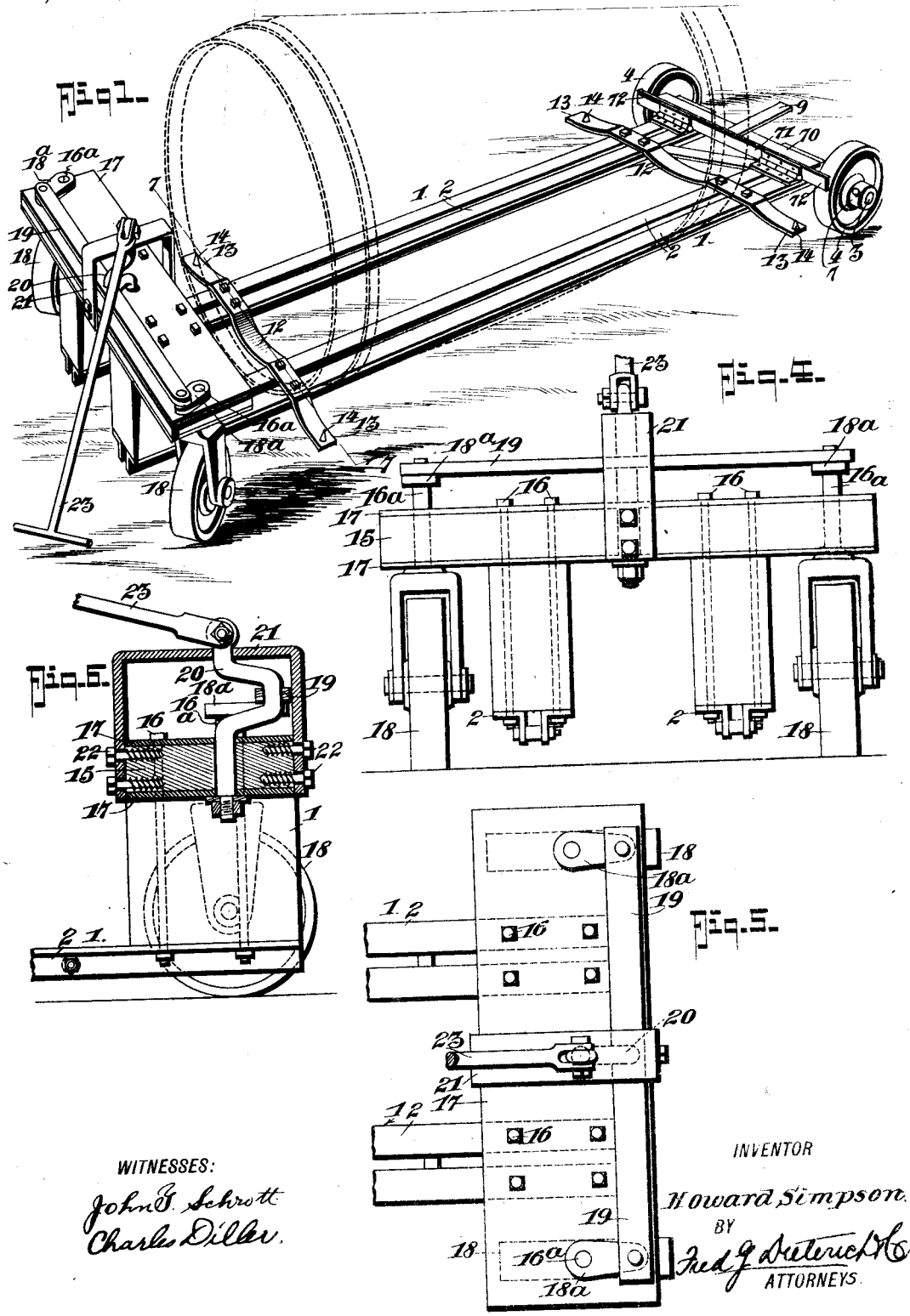

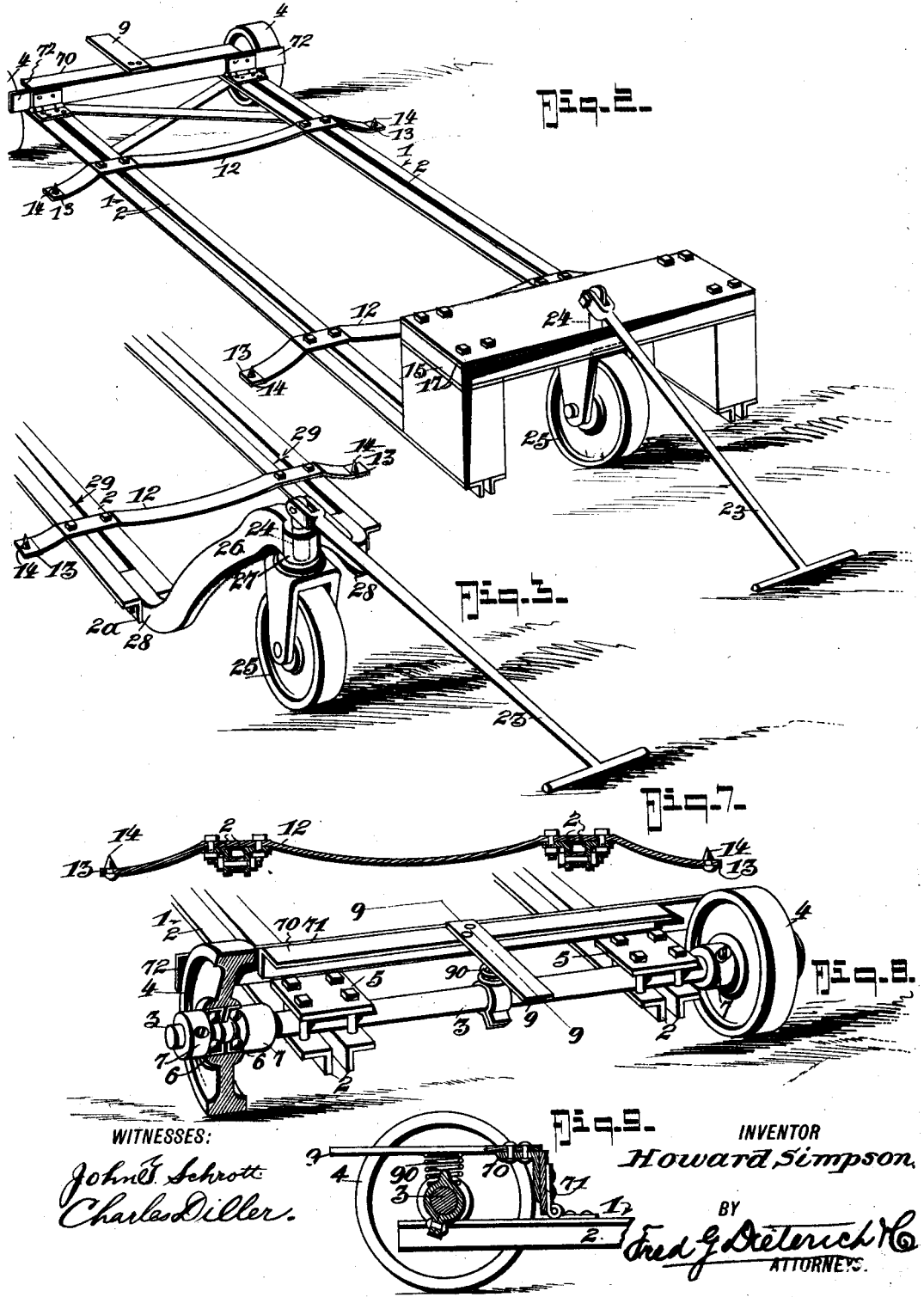

HOWARD SIMPSON, OF RICHMOND, VIRGINIA, ASSIGNOR OF ONE-FOURTH TO ANDREW C. STRICKLAND AND ONE-FOURTH TO ED WHITLOCK, BOTH OF RICHMOND, VIRGINIA.

TRUCK.

1,175,312.

Specification of Letters Patent.

Patented Mar. 14, 1916.

Application filed November 12, 1913. Serial No. 800,573.

*To all whom it may concern:*

Be it known that I, HOWARD SIMPSON, residing at Richmond, in the county of Henrico and State of Virginia, have invented a new and Improved Truck, of which the following is a specification.

My invention, which generally relates to improvements in trucks, is more specifically designed for handling heavy barrels, hogsheads and the like, and it primarily has for its object to provide a truck of the general character stated, of a simple and economical construction, that can be conveniently handled and which effectively serves its intended purposes.

Another object of my invention is to provide an improved construction of truck of the "low down" type having the parts coöperatively so arranged whereby a heavy barrel or hogshead can be readily rolled, sidewise, onto the track and then conveyed by a single person to the desired point of delivery.

A further object of my invention is to provide a low down truck composed of a rigid frame mounted on wheels and including a front or caster wheel section so arranged and combined with the main frame or body that the front or caster wheel or wheels can be swung entirely around, in a circle, as it were, without, in the slightest affecting the amount of the hogshead or barrel held upon the said body or main frame, and also capable of being easily manipulated so the user of the truck can handle the said truck in close places for either receiving or delivering the load.

Again, my invention has for its object to provide a simple form of low down truck, the several parts of which are adapted for carrying the hogsheads, large barrels or the like, lengthwise, that is with either end in front and thus permit of pulling the truck with its load through spaces where it is impossible to pass with the load held transversely upon the truck.

With other objects in view that will hereinafter appear, my invention consists in a low down truck embodying the peculiar construction and novel arrangement of the parts hereinafter fully described, specifically pointed out in the appended claims and illustrated in the accompanying drawings, in which:—

Figure 1 is a perspective view of a preferred form of my improved construction of low down truck, the same being shown as applied for use. Fig. 2 is a similar view of a modified form of my improved truck, the same being in the nature of a three wheeled truck. Fig. 3 is a detail perspective view of a modified form of the front or caster wheel end shown in Fig. 2, and illustrating all of the parts as formed of metal. Fig. 4 is a front view of the truck shown in Fig. 1. Fig. 5 is a top view of the truck shown in Fig. 1. Fig. 6 is a cross section of the front end of the four wheeled type of truck shown in Fig. 1. Fig. 7 is a transverse section of the main or body part of the truck on the line 7—7 on Fig. 1. Fig. 8 is a detail perspective view of the rear end of the truck with the foot lever brake included. Fig. 9 is a section on the line 9—9 on Fig. 8.

In the practical construction, the main frame or body portion of my improved truck, is made rigid, and comprises the opposite side portions 1, each of which is composed of a pair of longitudinal angle bars 2, so suspended with respect to the traveler wheels, that their lower edges are practically on the floor line, they being, in practice, but one and one-half inches above the floor.

At the rear end, the side members or bars 2 are underhung from the rear axle 3, the latter being fixedly held as at 5—5, on the side bars 2—2, the wheels being mounted on roller or ball bearings 6—6 and held to their bearings by set collars 7—7, as shown.

Hanging the main frame from the back axle, as stated and shown, admits of using carrier wheels 4, of large diameter and thereby make the truck run easier than is possible with wheels of smaller diameter.

70 designates an angle bar that extends across the rear end of the main frame, just in advance of the back axle, and the vertical member 71 of the said bar extends beyond the said side-bars 2—2 of the main frame and is normally held so that the outer ends 72 of the member project in front of the back wheels 4—4 to form brake members for engaging the said wheels in the manner and for the purpose presently explained.

9 designates a foot lever, in the nature of a metal bar, whose inner end is riveted to the hinged cross member 70 and whose outer end projects over the rear axle and normally held up out of contact with the axle by a spring 90, as shown.

As the truck runs very freely, by having the brake devices on the rear of the truck, arranged as shown and described, the operator at the rear end of the machine can readily hold the truck from running too fast by simply pressing down on the foot lever 9 to cause the ends 72 of the member 71 to engage the rear wheels 4—4.

12—12 designate a pair of cross bars, that form a part of the truck frame, and which form the seat or bed members on which the hogshead or barrel rests when rolled onto the truck. While I have shown but two of the bars 12, a greater number may be used, if desired. Each bar 12, midway its length, is dished to form a curved seat or bed for holding the barrel from freely rolling sidewise off the truck. The opposite ends of the bars 12 are mounted upon and riveted to the side bars 2—2 and said ends, which project beyond the said side bars 2, are curved downwardly to a point in line with the bottom edge of the side bars 2 and then horizontally outwardly to form penetrating or toe portions 13, the construction of the ends of the bars 12 being designed for being readily projected under the hogshead when it is desired to load the same onto the truck, and to facilitate the rolling of the hogshead onto the body proper of the truck, the ends or toe portions of the bars have pointed prongs 14, as shown. Furthermore, the projected ends of the cross bars 12 act as inclined ways when rolling the hogshead onto the truck and hence the hogshead can be readily rolled to cause it to ride over onto the main frame.

In the most complete and preferred form of my improved truck, the same has four wheels, one at each corner of the truck to properly balance the load and overcome the tendency of the heavy load tipping the truck at the sides or corners.

When the truck is arranged as a four wheeled truck, the front caster wheels and the supporting or head frame therefor are arranged as is best shown in detail in Figs. 4, 5 and 6, by reference to which it will be seen the same comprises two wooden blocks mounted upon the front end of the side bar 2—2, to which and to a wooden cross beam 15, they are made fast by the bolts 16.

17 designates metal face bars on the upper and underside of the cross beam 15.

A caster wheel 18 is mounted on each end of the cross beam 15 and the shanks 16ª of the said wheels 18 extend above the said beam and each connects with a crank arm 18ª.

19 designates a link bar pivotally connected at the ends to the crank arms 18ª and joined, midway its length, with a crank shaft 20 whose lower end journals in the cross beam 15 and the upper end in a ∩ shaped yoke 21 that straddles the beam 15 and is fastened thereon by the bolts 22, as shown.

23 designates the truck tongue or handle and its inner end is bifurcated to receive the upper end of the crank shaft 20; the said tongue being pivotally connected to the shaft so that it may be swung back upon the truck frame when the truck is not being used.

By reason of mounting the front caster wheels in the manner shown and described, it is obvious that by grasping the tongue, the truck can be readily pulled along with the load, as desired, and since the two caster wheels are joined by the crank and link mechanism described and shown, it follows that the front end of the truck can be easily turned in almost any direction and as the two wheels constantly move together there is practically no drag strain on the operator when making the necessary turns.

By having four wheels, one at each corner, a truck of great stability is provided, there being no danger in tipping the corners.

Instead of providing two front or caster wheels, as shown in Fig. 1, only a single front caster wheel may be used, as shown in Fig. 2, by reference to which it will be noticed that shank 24 of the wheel 25 that passes up through the cross beam 15 connects directly with the tongue. In this latter form, instead of using the wooden cross beam 15 and the end blocks, as shown in Fig. 2, the single caster wheel connection with the main frame may be all of metal, as shown in Fig. 3 which illustrates the said connection in the nature of a yoke member 26, the central portion 27 of which forms the bearing for the wheel shank 24. The end portions of the said yoke member are bent downwardly from the central member 27 and then terminate in horizontal ends 28 adapted to fit within the recesses 29 formed between the projected front ends 2ª of the side bars 2 to which the said ends 28 are securely bolted, as shown.

From the foregoing description, taken in connection with the drawings, the complete construction, the manner of operation and the advantages of my improved truck will be readily apparent.

By reason of mounting the front or caster wheels and connecting the same with the main frame, as shown and described, the front or caster wheels at all times remain in line with the tongue, the attachment of the latter permitting the carrying of the latter from one direction over the truck front to the opposite direction without moving the said front or caster wheels. This wide range of motion of the tongue is of importance since it permits of handling the truck in very close places to either receive or deliver the load.

What I claim is:—

1. In a truck, a main frame composed of sides, each formed of a pair of spaced angle irons, axle clamps mounted on the rear ends of each pair of said angle irons, a rear wheel axle held in the said clamps, cross bars mounted upon and secured to the side bars whose ends project beyond the side bars and are bent down to form horizontal members, a cross member located adjacent the rear axle wheels and having its ends projected over the said wheels for moving into engagement therewith, said cross member being hingedly connected to the angle irons of the side bars of the frame, a lever secured to the said hinged cross bar and projected rearwardly over the rear axle, means for holding the cross bar and lever up to their normal position, and a caster wheel connected with the front end of the side bars of the main frame.

2. In a truck, a main frame composed of sides, each formed of a pair of spaced angle irons, axle clamps mounted on the rear ends of each pair of said angle irons, a rear axle held in said clamps and wheels mounted on said axle, cross bars mounted upon and secured to said side bars, the ends of said cross bars projecting beyond the side bars and bent downwardly to form horizontal members, prongs carried by the ends of said cross bars and a caster wheel connected with the front end of said side bars of the main frame.

3. In a truck, a main frame composed of sides, each formed of a pair of spaced angle irons, axle clamps mounted on the rear ends of each pair of angle irons, the rear wheel carrying axle held in the said clamps, cross bars mounted on the side bars whose ends project beyond the said side bars and are bent down to form horizontal members, a cross member located adjacent the rear axle wheel and having the ends projected over the wheels to move into engagement therewith, said cross member being hingedly connected to the said bars of the frame, a lever secured to the said hinged cross bar and projected rearwardly over the rear axle, and a caster wheel carrying frame connected with the front end of the said bars.

4. In a truck, a main frame composed of sides, each formed of a pair of spaced angle bars, a rear wheel carrying axle fastened upon the rear ends of the said angle bars, cross bars mounted on the side bars whose ends extend beyond the said side bars and curve downwardly and outwardly, a front frame comprising members fixedly connected to the front ends of the side bars of the main frame, a caster wheel supported by the said members whose shank extends above the said members and a draft tongue hingedly connected to the upper end of the said shank.

5. In a truck, the combination with the rear wheel carrying axle and the main frame pendently supported at its rear end from the said axle, the said main frame comprising sides each formed of a pair of spaced angle irons, at least one cross bar mounted and secured upon the said angle bars and having the ends curved downwardly and projected rearwardly from the said bars, a front caster wheel carrying frame consisting of a yoke member having a central bearing portion and bifurcated ends the said ends being curved downwardly and terminating in horizontal members that extend between the front ends of the angle bars of the side of the main frame, means for securing the said ends to the said angle bars, a caster wheel whose shank is journaled in the central bearing portion of the yoke member, and a draft tongue hingedly connected with the upper end of the said shank.

HOWARD SIMPSON.

Witnesses:
MORTEN S. THALLIANER,
HERBERT C. HORD.